United States Patent
Tsai et al.

(10) Patent No.: US 10,394,929 B2
(45) Date of Patent: Aug. 27, 2019

(54) ADAPTIVE EXECUTION ENGINE FOR CONVOLUTION COMPUTING SYSTEMS

(71) Applicant: MediaTek Inc., Hsinchu (TW)

(72) Inventors: Sung-Fang Tsai, Hsinchu (TW);
Pei-Kuei Tsung, New Taipei (TW);
Po-Chun Fan, Zhubei (TW); Shou-Jen Lai, Zhubei (TW)

(73) Assignee: MediaTek, Inc., Hsinchu (TW)

( * ) Notice: Subject to any disclaimer, the term of this patent is extended or adjusted under 35 U.S.C. 154(b) by 127 days.

(21) Appl. No.: 15/787,897

(22) Filed: Oct. 19, 2017

(65) Prior Publication Data
US 2018/0173676 A1    Jun. 21, 2018

Related U.S. Application Data

(60) Provisional application No. 62/436,488, filed on Dec. 20, 2016.

(51) Int. Cl.
*G06F 17/15* (2006.01)
*G06F 17/16* (2006.01)
*G06N 3/00* (2006.01)

(52) U.S. Cl.
CPC .............. *G06F 17/15* (2013.01); *G06F 17/16* (2013.01); *G06N 3/00* (2013.01)

(58) Field of Classification Search
None
See application file for complete search history.

(56) References Cited

U.S. PATENT DOCUMENTS

| 5,195,050 A * | 3/1993 | Hsu ................... G06F 17/16 708/420 |
| 6,021,421 A * | 2/2000 | Retter ................ G06F 17/10 708/422 |
| 2001/0033287 A1 * | 10/2001 | Naegle ............... G06T 15/503 345/601 |
| 2018/0173676 A1 * | 6/2018 | Tsai ................... G06N 3/00 |

FOREIGN PATENT DOCUMENTS

| CN | 1894703 A | 1/2007 |
| CN | 104915322 A | 9/2015 |

OTHER PUBLICATIONS

Y.-H. Chen, et al., "Eyeriss: An Energy-Efficient. Reconfigurable Accelerator for Deep Convolutional. Neural Network," IEEE J. Solid-State Circuits, vol. 52, issue 1, Jan. 2017, pp. 127-138.
S. Chetlur, et. al., "cuDNN: Efficient primitives for deep learning," arXiv Dec. 18, 2014.

* cited by examiner

*Primary Examiner* — David H Malzahn
(74) *Attorney, Agent, or Firm* — Tong J. Lee

(57) ABSTRACT

A system performs convolution computing in either a matrix mode or a filter mode. An analysis module generates a mode select signal to select the matrix mode or the filter mode based on results of analyzing convolution characteristics. The results include at least a comparison of resource utilization between the matrix mode and the filter mode. A convolution module includes processing elements, each of which further includes arithmetic computing circuitry. The convolution module is configured according to the matrix mode for performing matrix multiplications converted from convolution computations, and is configured according to the filter mode for performing the convolution computations.

20 Claims, 9 Drawing Sheets

ADAPTIVE EXECUTION ENGINE FOR CONVOLUTION COMPUTING SYSTEMS

CROSS-REFERENCE TO RELATED APPLICATIONS

This application claims the benefit of U.S. Provisional Application No. 62/436,488 filed on Dec. 20, 2016, the entirety of which is incorporated by reference herein.

TECHNICAL FIELD

Embodiments of the invention relate to computer architectures for convolution computing.

BACKGROUND

Deep learning has gained wide acceptance for its superior performance in the fields of computer vision, speech recognition, natural language processing, and bioinformatics. Deep learning is a branch of machine learning that uses artificial neural networks containing more than one hidden layer. One type of artificial neural network, called convolutional neural network (CNN), has been used by deep learning over large data sets such as image data. CNNs have shown excellent results in image applications. For example, CNNs can be used in feature extraction. From raw image pixels received at the input end, a CNN can generate scores for different classes of features at the output end.

Computational workloads of CNNs are intensive. The core computation of a CNN is convolution, which involves a high-order nested loop. For feature extraction, a CNN convolves input image pixels with a set of two-dimensional (2D) filters over a set of channels (e.g., red, green and blue), followed by nonlinear computations, down-sampling computations, and class scores computations. The convolution computations have been shown to be highly resource-demanding. In addition to the CNN, convolution computations are frequently used to solve scientific and engineering problems. Therefore, there is a need for optimizing the convolution computations to achieve performance improvement.

SUMMARY

In one embodiment, a system is provided for performing convolution computing. The system comprises an analysis module, which generates a mode select signal to select one of a matrix mode and a filter mode based on results of analyzing convolution characteristics. The results include at least a comparison of resource utilization between the matrix mode and the filter mode. The system further comprises a convolution module coupled to the analysis module. The convolution module including a plurality of processing elements, each of which includes arithmetic computing circuitry. The convolution module is configured according to the matrix mode for performing matrix multiplications converted from convolution computations, and is configured according to the filter mode for performing the convolution computations.

In another embodiment, a method is provided for performing convolution computing. The method comprises: receiving, by a convolution module, a mode select signal selecting one of a matrix mode and a filter mode. The mode select signal is generated based on results of analyzing convolution characteristics that include at least a comparison of resource utilization between the matrix mode and the filter mode. The convolution module includes a plurality of processing elements, each of which includes arithmetic computing circuitry. The method further comprises: in response to selecting the matrix mode, performing matrix multiplications converted from convolution computations; and in response to selecting the filter mode, performing the convolution computations.

The embodiments of the invention enable efficient convolution computations by adapting the configuration of and/or data dispatch to processing elements according to the characteristics of a given CNN problem. Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
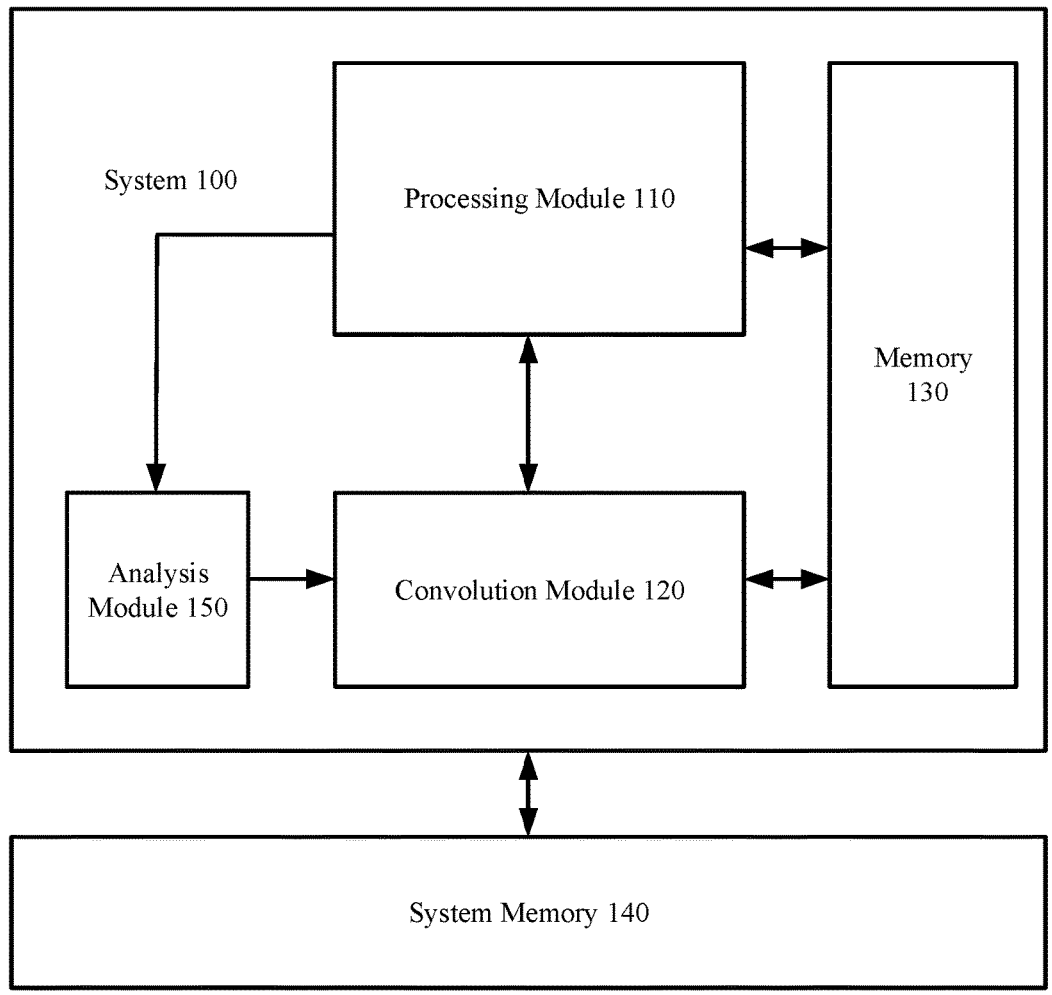
FIG. 1 illustrates a system for performing CNN computations according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for efficient convolution computations. The system includes a convolution module which further includes processing elements for performing convolution computations. The convolution module is the core computing block of a convolution computing system. In the following, convolution computation is described using the CNN as an example. It is understood that the convolution computation techniques described herein may be applied to any applications or problems for which convolution is computed.

Before describing the hardware architecture for CNN computations, it may be useful to describe some terminologies used in the CNN computations. Typically, filters used for CNN computations are small in size compared to the input image size. For example, a filter may be composed of 5×5 filter weights; that is, 5 filter weights along the width dimension and 5 filter weights along the height dimension. In comparison, an input image may have hundreds or thousands or more pixels in each of the width and the height dimensions. In addition to width and height, an input image has a depth dimension, which may be the number of color channels in the input image. During a convolution pass, a filter slides across the width and/or height of the input image and dot products are computed between the filter weights and the image pixel values at any position. As the filter slides over the input image, a 2D output feature map is generated. The output feature map is a representation of the filter response at every spatial position of the input image. When multiple filters are applied to an input image, multiple output feature maps are generated. Each output feature map is generated with the use of a filter, and different output feature maps can be used to detect different features in the input image. When computing the dot products (i.e., convolution), a filter may slide over an input image one pixel at a time. In some cases, a filter may slide over an input image more than one pixel at a time. The number of pixels that a filter slides over an input image at every step of convolution is called a stride size.

In one embodiment, a CNN computing system includes at least two engines: a matrix engine and a filter engine. The matrix engine performs matrix multiplications of two matrices, which are converted from convolutions of an input image and a filter. Matrix multiplications are easy to be parallelized, but require a large memory and bandwidth. The filter engine may include processing elements that are interconnected for efficient convolution computations, or may include processing elements that receive image data and filter weights dispatched in a way that is efficient for convolution computations. However, when the problem size and the hardware size mismatch, the filter engine or the matrix engine may suffer from inefficient hardware utilization.

FIG. 1 illustrates an example of a system 100 in which embodiments of the invention may operate. The system 100 includes a processing module 110 coupled to a convolution module 120 for performing convolution computations. The processing module 110 may include one or more processors, each of which further includes circuitry operative to perform arithmetic and/or logical operations. Examples of the processors include, but are not limited to, central processing units (CPUs), arithmetic and logic units (ALUs), vector processors, and other general-purpose and/or special-purpose processing circuitry. The convolution module 120 is the execution engine for performing convolutions. The convolution module 120 may include a plurality of hardware components, referred to as processing elements, each of which includes arithmetic computing circuitry, such as one or more of: a multiplier, an adder, an accumulator, an ALU, a processor or any combinations of the above. The processing elements may be arranged as one or more arrays. The convolution module 120 performs convolution computations in either a matrix mode or a filter mode according to a mode select signal from an analysis module 150.

In one embodiment, the output of the convolution module 120 may be sent to the processing module 110, which performs a combination of nonlinear operations, looping operations, fully-connected neural network operations, and the like, as needed for a specific image application. In one embodiment, the processing module 110 and the convolution module 120 in combination act as a feature extractor, which is capable of extracting a given feature (e.g., a car, a person, a boat, etc.) from a given input image. Alternatively, the processing module 110 and the convolution module 120 may perform CNN computations for a number of image applications not limited to the description above. The system 100 may be part of a computing device, communication device, or a combination of computing and communication device. In another embodiment, the processing module 110 and the convolution module 120 in combination may perform other scientific or engineering calculations that are related or unrelated to the CNN.

The analysis module 150 performs analysis on a set of convolution characteristics. In one embodiment, the analysis module 150 may be coupled to the processing module 110 and/or the memory 130 to receive the convolution characteristics. The analysis module 150 may also be coupled to the convolution module 120 to send a mode select signal for selecting a convolution mode according to the analysis result. In an alternative embodiment, the analysis module 150 may be part of the processing module 110. The analysis module 150 may be a hardware component or a software program stored in a machine-readable medium executable by a machine, such as circuitry in the processing module 110.

In one embodiment, the analysis module 150 determines how each convolution characteristic affects the performance statistics including resource utilization, in view of hardware constraints and user requirements, if any. The performance statistics may also include the required processing time and/or power consumption limit. In one embodiment, the analysis module 150 may perform this analysis online (i.e., during runtime operation) or offline. The hardware constraints may include, but are not limited to, the number of processing elements in the convolution module 120, the height and width of the array of the processing elements allocated to each of the matrix mode and the filter mode, the power consumption, processing speed and communication bandwidth of each processing element, and memory capacity and memory bandwidth. The user requirements may include one or more of: an upper bound for power consumption, an upper bound for required processing time, and lower bound for resource utilization such as the utilization of memory resources and processing resources.

When given specific convolution characteristics for an image application, the analysis module 150 compare the performance statistics between the matrix mode and the filter mode, for the given hardware in the convolution module 120 and user requirements, if any. The analysis module 150 compares the performance of the two modes and accordingly generates a mode select signal for the convolution module 150. In one embodiment, the analysis module 150 may base its mode selection on whether there is a match between the size of the convolution computations and the size of the array or arrays in the convolution module 120, or the degree of mismatch between the size of the convolution computations and the size of the array or arrays in the convolution module 120.

In one embodiment, the convolution characteristics analyzed by the analysis module 150 may include, but be not limited to: input image height and width, number of channels, input image count, input filter height and width, input filter count, stride size, input batch size, parallelism dimensions, input channel order, output channel order, etc. To be more specific, the input batch size is the size of a collection of data processed together for improved data reuse ratio in the convolution computing. The parallelism dimensions are the dimensions of the processing elements that are assigned to the convolution computations in parallel. These assigned processing elements are referred to as a parallel processing unit (PPU). For example, a PPU may include a 3×3=9 ALUs for parallel convolution computing, and another PPU may include 7×7=49 ALUs. The parallelism dimensions also include the PPU placement shape. For example, a PPU with 32 ALUs may be placed in a 2D array of 8×4 ALUs, or a 2D array of 16×2 ALUs, or a 1D array of 32×1 ALUs for different input data footprints. With respect to the channel order of the input channel and the output channel, the channel order indicates the image footprint in the memory with respect to the color channel arrangement. For RGB channels, one channel order may be a repeated pattern of RGB, and another channel order may be all R channels followed by all G channels and then followed by all G channels.

The analysis module 150 may calculate the performance statistics for both the matrix mode and the filter mode with different combinations of convolution characteristics that cover a wide range of scenarios. During system runtime operation, when the system 100 is given a set of convolution characteristics for an image application, the analysis module 150 determines which mode to select based on the calculated performance statistics. The analysis module 150 may generate and send a model select signal to the convolution module 220 at runtime of the system 100.

Although FIG. 1 shows the analysis module 150 as a hardware module outside of the processing module 110, in some embodiments the analysis module 150 and the processing module 110 may be implemented as one hardware device including general-purpose computing elements, special-purpose computing elements or a combination of both computing elements. In one embodiment, the analysis module 150 may be programmable. In alternative embodiments, the analysis module 150 may reside on another processing platform such as a computing device and communicate the analysis results with the convolution module 120 via a network. In one embodiment, the analysis module 150 may execute machine-readable instructions for performing the aforementioned analysis and may send the mode select signal for selecting the matrix mode or the filter mode in the form of machine-readable instructions to the convolution module 120.

In one embodiment, the system 100 may also include a memory 130, which may be located on-chip (i.e., on the same chip as the processors in the processing module 110) and include caches, register files and buffers made of random access memory (RAM), such as static random access memory (SRAM) devices. Alternatively, the memory 130 may be located off-chip and be part of a main memory made of RAM, such as dynamic random access memory (DRAM) devices. The memory 130 may be shared by all of the processing elements in the convolution module 120. The system 100 may also be coupled to a system memory 140 such as a DRAM device or other volatile and/or non-volatile memory devices.

Figure 2A:
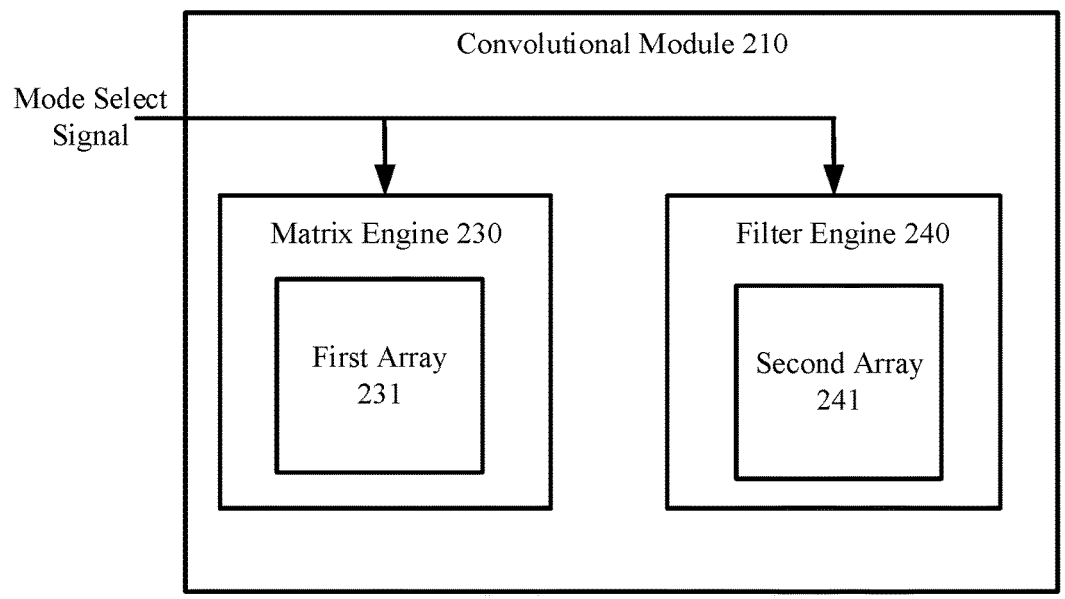
FIG. 2A illustrates a convolution module that includes a matrix engine and a filter engine according to one embodiment.

FIG. 2A illustrates a convolution module 210 according to a first embodiment of the convolution module 120 of FIG. 1. The convolution module 210 includes a matrix engine 230 and a filter engine 240. Each of the matrix engine 230 and the filter engine 240 is a hardware device and includes a first array 231 and a second array 241, respectively, of processing elements. The processing elements in the first array 231 have a first array configuration, and the processing elements in the second array 241 have a second array configuration. Detailed description of the first and the second array configurations will be provided in connection with FIG. 3 and FIG. 4, respectively. The first array 231 and the second array 241 may be of the same size or different sizes. When the mode select signal from the analysis module 150 (FIG. 1) indicates that the matrix mode is selected for an image application, the matrix engine 230 is activated for convolution computations (which are first converted into matrix multiplications). When the mode select signal from the analysis module 150 indicates that the filter mode is selected for an image application, the filter engine 240 is activated for convolution computations.

Figure 2B:
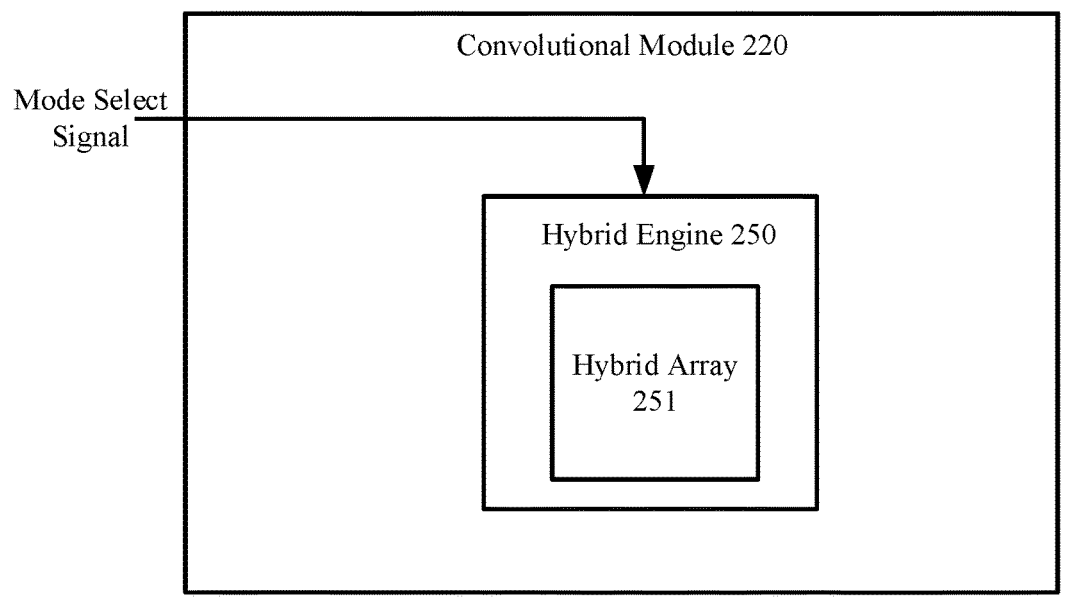
FIG. 2B illustrates a convolution module that includes a hybrid engine according to another embodiment.

FIG. 2B illustrates a convolution module 220 according to a second embodiment of the convolution module 120 of FIG. 1. The convolution module 220 includes a hybrid engine 250 which further includes a hybrid array 251 of processing elements shared by both the matrix mode and the filter mode. When the mode select signal from the analysis module 150 indicates that the matrix mode is selected for an image application, the hybrid engine 250 is configured to be the first array configuration according to the matrix mode. When the mode select signal from the analysis module 150 indicates that the filter mode is selected for an image application, the hybrid engine 250 is configured to be the second array configuration according to the filter mode.

Figure 3:
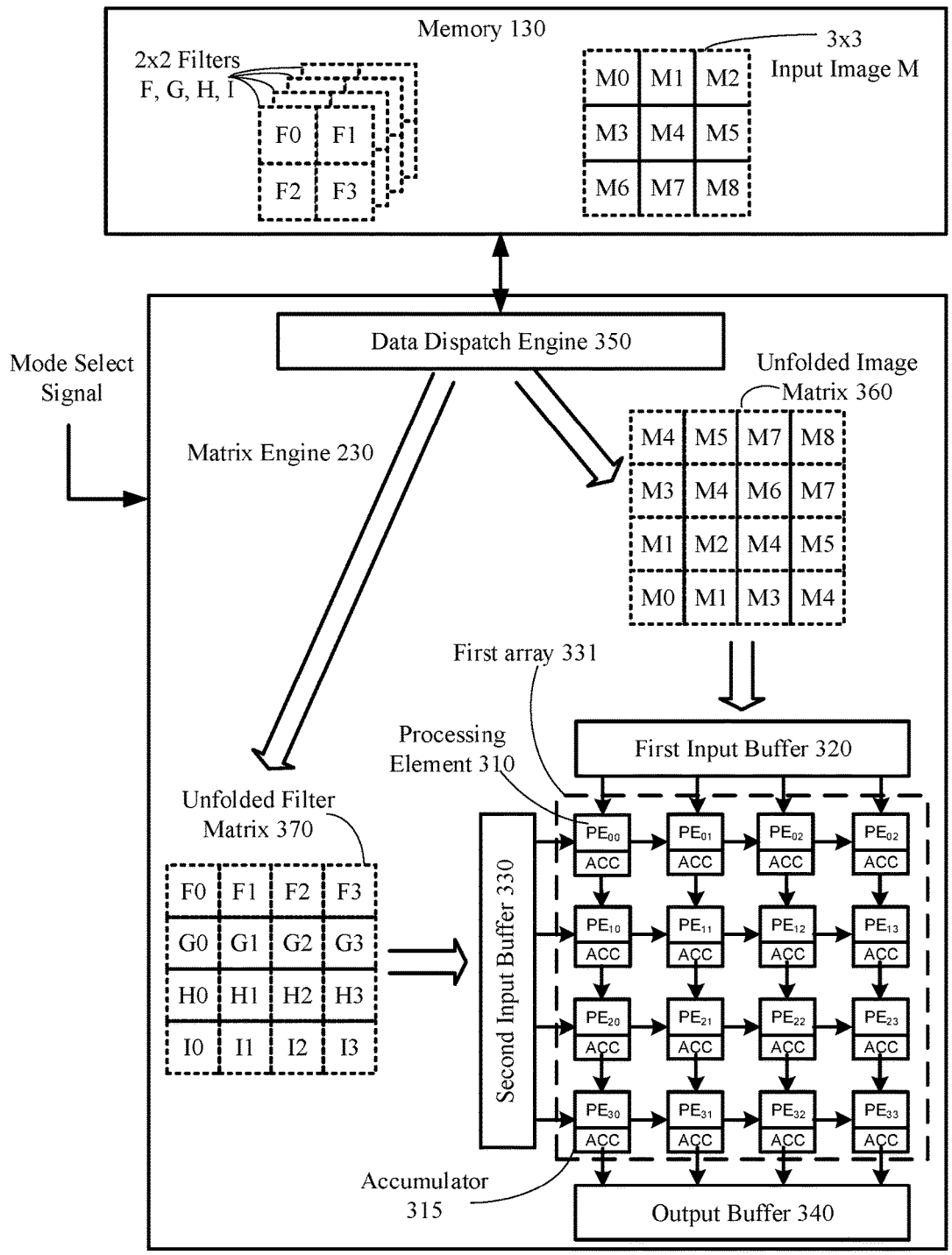
FIG. 3 illustrates a matrix engine according to one embodiment.

FIG. 3 illustrates an example of the matrix engine 230 according to one embodiment. For illustration purpose, FIG. 3 shows hardware components in the matrix engine 230 as well as an example of data (in dotted lines) to be convolved by the hardware components. The data to be convolved includes an input image (e.g., the 3×3 image M consisting of nine pixel values M0, M1, M2, . . . , M8) and four 2×2 filters F, G, H and I, all or part of which may be stored in the memory 130. As mentioned before, the matrix engine 230 is activated when the matrix mode of the convolution module 120 is selected.

In this example, the matrix engine 230 includes a first array 331 of processing elements 310, which are interconnected via vertical connections and horizontal connections according to the first array configuration. The first array 331 is one example of the first array 231 of FIG. 2A. Each processing element 310 is coupled to an accumulator 315 for accumulating partial sums. In an alternative embodiment, the accumulator 315 may be part of the processing element 310. The matrix engine 230 may be coupled to a first input buffer 320, a second input buffer 330 and an output buffer 340. The first input buffer 320 may be used to temporarily store pixel values of an input image; thus, the pixel values may enter the first array 331 from top to bottom (along the vertical direction) in the example as shown. The second input buffer 330 may be used to temporarily store filter weights of one or more filters; thus, the filter weights may enter the first array 331 from left to right (along the horizontal direction) in the example as shown. The output buffer 340 may be used to temporarily store values of an output feature map (i.e., the convolution result of the pixel values and the filter weights), or at least a portion of the output feature map. Alternatively, the pixel values may enter the first array 331 in the horizontal direction, and the filter weights may enter the first array 331 in the vertical direction.

The matrix engine 230 performs matrix multiplication efficiently. In one embodiment, the matrix engine 230 includes a data dispatch engine 350, which unfolds pixel values in a 2D convolution window into a row of an unfolded image matrix 360, and dispatches the unfolded pixel values to the first array 331 via the input buffer 320 or 330. Each filter applied to the input image defines a 2D convolution window. As the 2D convolution window (i.e., the filter) slides over the entire input image M, rows of the unfolded image matrix 360 are generated. In this simplified example, the 3×3 input image M is unfolded into the larger 4×4 unfolded image matrix 360. The data dispatch engine 350 also unfolds the filter weights into rows of an unfolded filter matrix 370, and dispatches the unfolded filter weights to the first array 331 via the input buffer 320 or 330. The filter weights of each filter is unfolded into a single row of the unfolded filter matrix 370 in this example. In an alternative embodiment, the unfolding of the image data and the filter data may be performed outside the matrix engine 230 by another engine, processor or circuitry in the system 100, and may be stored in the memory 130 accessible by the matrix engine 230. It is noted that each element in the unfolded image matrix 360 is also an element of the input image M, and each element in the unfolded filter matrix 370 is also an element of one of the filters.

As shown in FIG. 3, the rows of the unfolded image matrix 360 may proceed in the vertical direction from top to bottom of the first array 331, as the columns of the unfolded filter matrix 370 proceeds in the horizontal direction from left to right of the first array 331. All of the processing elements 310 are identical and run under the same clock. Each pair of processing element 310 and accumulator 315 in the first array 331 performs multiply-and-add and accumulation operations to multiply a pixel value with a filter weight and add the product to an accumulated partial sum. The result of the matrix multiplications is the convolution result of output feature maps, which is sent to the output buffer 340.

The matrix multiplications performed by the matrix engine 230 are easy to be parallelized for execution on a single-instruction-multiple-data (SIMD) architecture, such as the first array 331 of processing elements 310. However, the unfolding of an input image into an unfolded image matrix (e.g., the unfolded image matrix 360) creates a significant amount of overhead on system resources such as memory capacity and memory bandwidth, as the unfolded image matrix occupies more storage space and takes up more memory bandwidth than the original input image.

Figure 4:
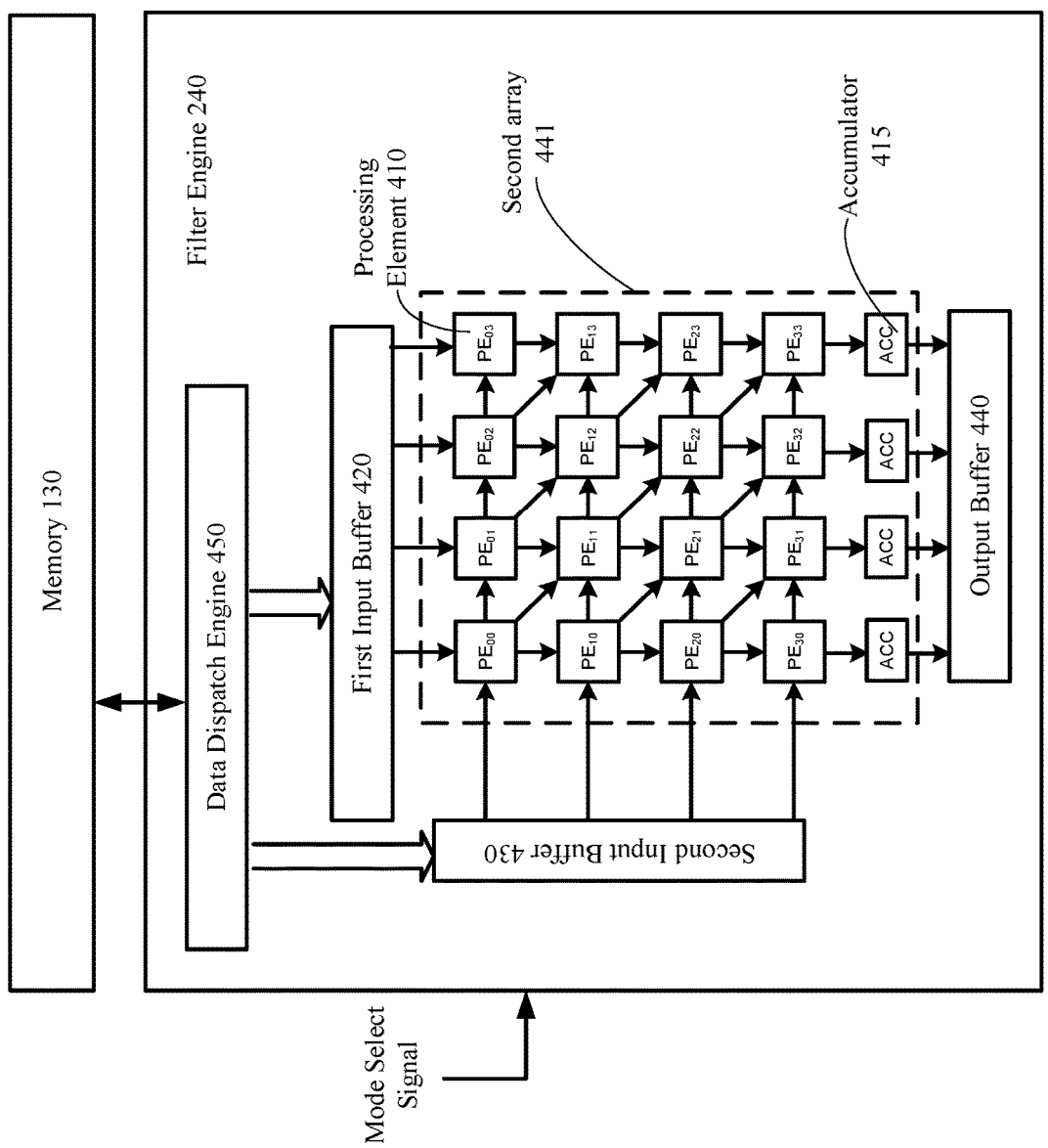
FIG. 4 illustrates a filter engine according to one embodiment.

FIG. 4 illustrates an example of the filter engine 240 according to one embodiment. As mentioned before, the filter engine 240 is activated when the filter mode of the convolution module 120 is selected.

The filter engine 240 includes a second array 441 of processing elements 410, which are interconnected via vertical connections, horizontal connections and diagonal connections according to the second array configuration. The second array 441 is one example of the second array 241 of FIG. 2A. The filter engine 240 may be coupled to a first input buffer 420, a second input buffer 430 and an output buffer 440. The horizontal connections allow the rows of filter weights to be reused across the processing elements 410 horizontally. The diagonal connections allow the rows of pixel values to be reused across the processing elements 410 diagonally, and the vertical connections allow the partial sums to be accumulated vertically.

In the embodiment of FIG. 4, a data dispatch engine 450 dispatches pixel values and filter weights to the second array 441 via the input buffers 420 and 430. The pixel values propagate through the second array 441 via respective diagonal connections, and the filter weights propagate through the second array 441 via respective horizontal connections. Each processing element 410 operates on the pairs of pixel values and filter weights, and propagates the results via respective vertical connections. Accumulators 415 accumulate partial sums of the convolution propagating on respective vertical connections. In an alternative embodiment, the filter weights may use the vertical connections, and the partial sums may use the horizontal connections. Moreover, alternative diagonal connections may be orthogonal to what is shown in FIG. 4; that is, the alternative diagonal connections may point from the lower-left to the upper-right.

In one embodiment, all of processing elements 410 in the same diagonal may be directly connected to the first input buffer 420 to receive the same image pixel values at the same cycle. Similarly, all of processing elements 410 in the same row may be directly connected to the second input buffer 430 to receive the same filter weights at the same cycle. Each processing element 410 performs a one-dimensional convolution; that is, multiply-and-add operations, to multiply a pixel value with a filter weight and add the product to a partial sum accumulated in the same processing element. All of the processing elements 410 are identical and run under the same clock. All of the processing elements 410 that reuse the same value receive that value at the same cycle. The partial sums generated from each processing element 410 are sent to its neighbor processing element 410 immediately.

The filter engine 240 provides a hardware accelerator platform that allows 2D convolution to be directly mapped to an array of processing elements (i.e., the second array 441). The mapping is straightforward and easy to implement. However, when there is disparity between the size of the 2D convolution and the size of the second array 441, some of the processing elements 410 may be left un-utilized and leads to inefficient resource utilization.

Thus, the analysis module 150 of FIG. 1 is responsible for analyzing parameters of convolution computations to determine whether the matrix mode or the filter mode is best suited for the computation before the computations take place. In one embodiment, the analysis module 150 may choose between the matrix engine 230 for the matrix mode and the filter engine 240 for the filter mode. In an alternative embodiment, the analysis module 150 may choose between the matrix mode and the filter mode of a same hardware engine, such as the hybrid engine 250 of FIG. 2B.

Figure 5:
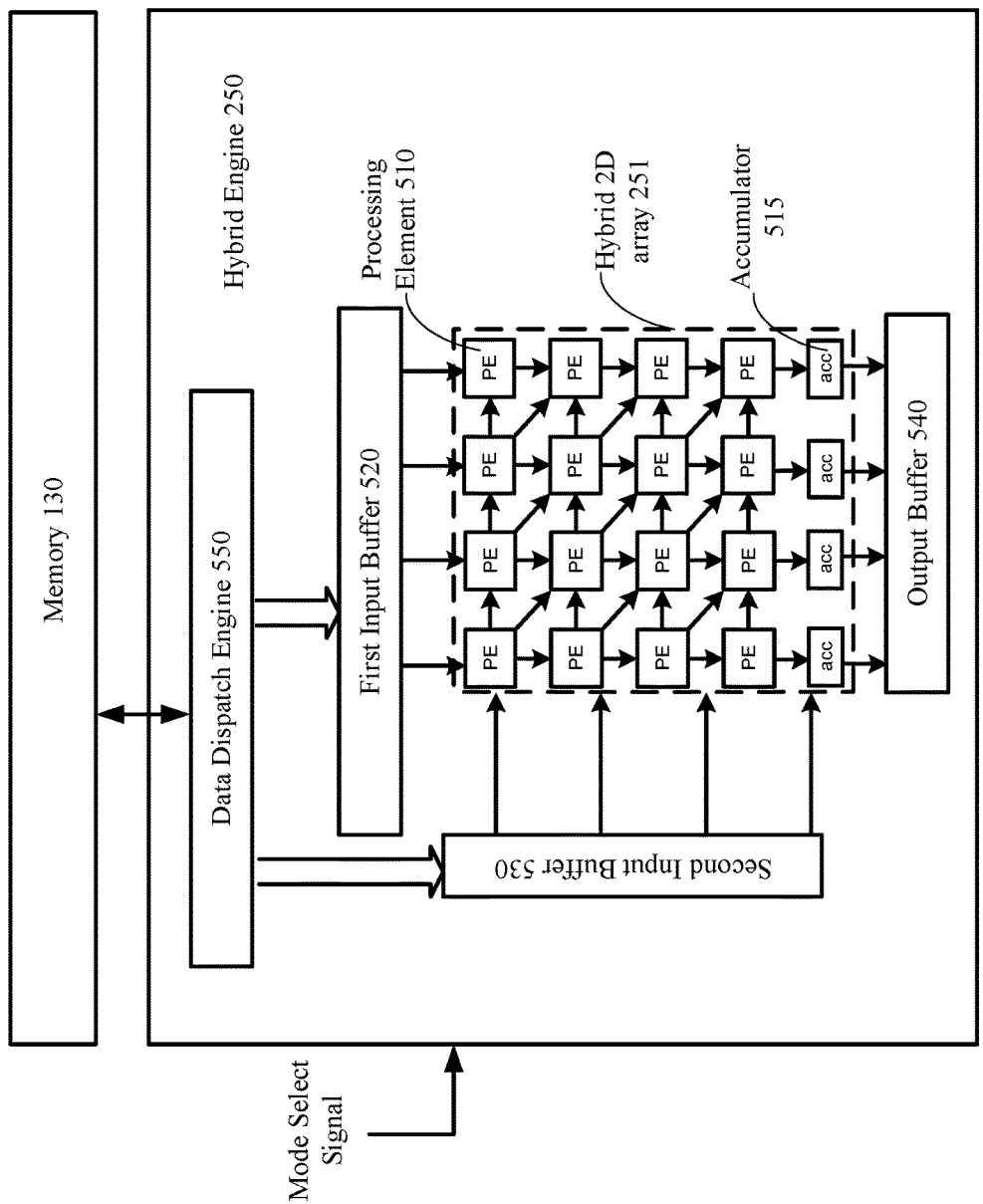
FIG. 5 illustrates a hybrid engine according to one embodiment.

FIG. 5 is a diagram an example of the hybrid engine 250 according to one embodiment. The hybrid engine 250 include the hybrid array 251 of processing elements 510, which can be configured, at runtime, to have the first array configuration when the matrix mode is selected and to have the second array configuration when the filter mode is selected. More specifically, when the matrix mode is selected, the hybrid array 251 may disable its diagonal connections, and enable its vertical and horizontal connections for propagating pixel values and filter weights, respectively. The hybrid engine 250 in the matrix mode performs the same operations as the matrix engine 230 of FIG. 3, and each processing element 510 performs the same operations as a corresponding pair of the processing element 310 and the accumulator 315. Accumulators 515 in the matrix mode may be disabled as the accumulation operations are performed by the processing element 510. When the filter mode is selected, the hybrid array 251 may enable its diagonal connections for propagating pixel values, and also enable its vertical and horizontal connections for propagating partial sums and filter weights, respectively. The hybrid engine 250 in the filter mode performs the same operations as the filter engine 240 of FIG. 4, and each processing element 510 performs the same operations as a corresponding processing element 410. Accumulators 515 in the filter mode may be enabled to perform the accumulation of partial sums.

The hybrid engine 250 includes a data dispatch engine 550, which dispatches data to the hybrid array 251 according to the mode select signal. In one embodiment, the data dispatch engine 550 in the matrix mode unfolds the pixel values and the filter weights into an unfolded image matrix and an unfolded filter matrix, respectively, as shown in FIG. 3, and dispatches the pixel values and the filter weights to the hybrid array 251 in the vertical direction and the horizontal direction, respectively. In an alternative embodiment, the unfolding of the image data and the filter data may be performed outside the hybrid engine 250 by another engine, processor or circuitry, and may be stored in a memory accessible by the hybrid engine 250. The data dispatch engine 550 in the filter mode dispatches the pixel values and the filter weights to the hybrid array 251 in the diagonal direction and the horizontal direction, respectively, as described in connection with FIG. 4.

In alternative embodiments, the data carried by the vertical and horizontal connections in the matrix mode operations may be interchanged; e.g., the pixel values may be sent over the horizontal connections and the filter weights may be sent over the vertical connections. Similar changes may be made to the data carried by the diagonal, vertical and horizontal connections as mentioned above in connection with the filter mode operations.

The hybrid engine 250 may also include a first input buffer 520, a second input buffer 530 and an output buffer 540, which are used in both the matrix mode and the filter mode for buffering input and output data of the hybrid array 251. The use of the hybrid engine 250 may increase resource utilization, as the same set of processing elements and the same set of buffers are used regardless which mode is selected.

Figure 6:
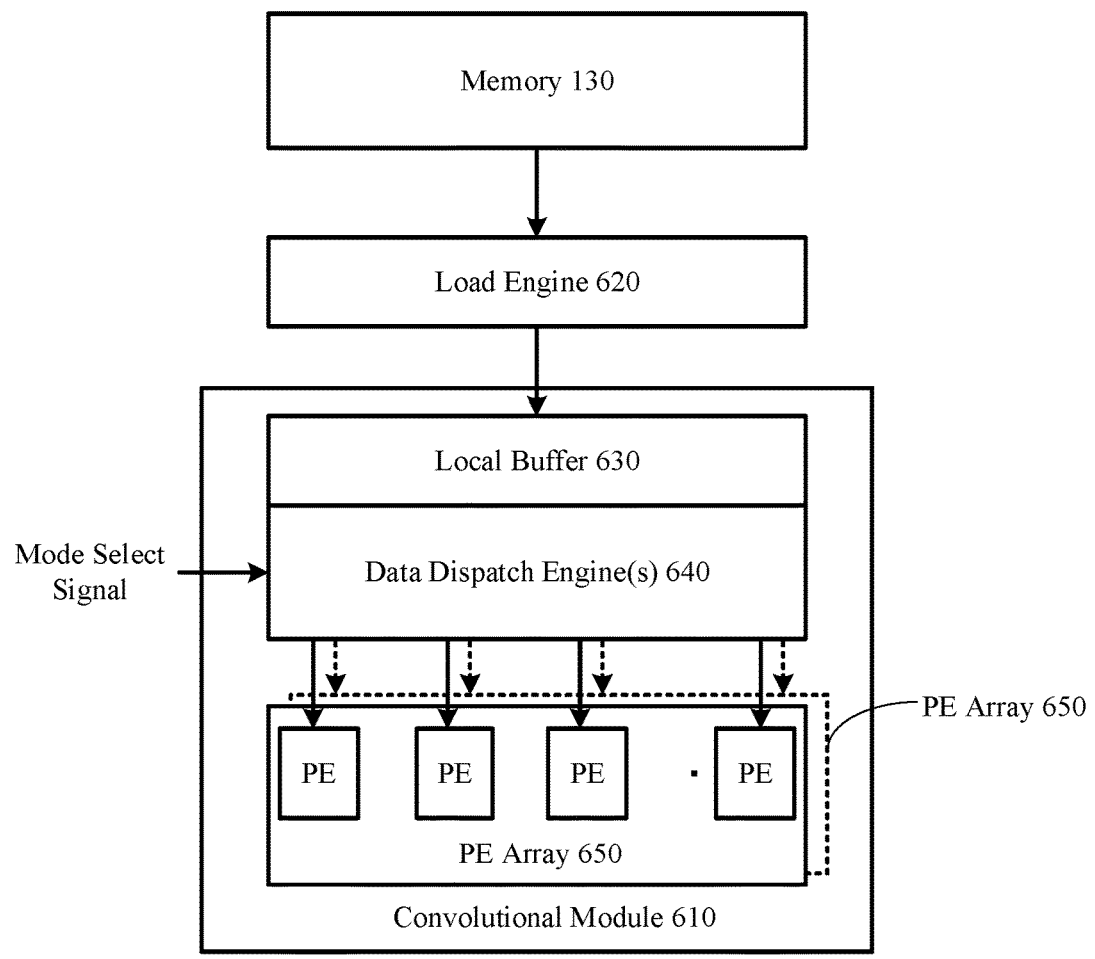
FIG. 6 illustrates a convolution module according to another embodiment.

FIG. 6 illustrates a convolution module 610 according to another embodiment of the system 100 (FIG. 1). The convolution module 610 may be one embodiment of the convolution module 120 in FIG. 1. In this embodiment, a load engine 620 loads image data and filter weights from the memory 130 to a local buffer 630 in the convolution module 610. The local buffer 630 is coupled to a data dispatch engine 640, which, according to a mode select signal, dispatches data from the local buffer 530 to corresponding ones of processing elements in a processing element array (PE array) 650. In one embodiment, the convolution module 610 includes two PE arrays 650, one as a matrix engine for performing matrix multiplications and the other one as a filter engine for performing convolution computations. In another embodiment, the convolution module 610 includes one PE array 650, which serves as a hybrid engine for performing, according to a mode select signal from the analysis module 150 (FIG. 1), matrix multiplications or convolution computations. In the example of FIG. 6, one PE array 650 is shown in dotted lines to indicate that the convolution module 610 may include one PE array 650 or two PE arrays 650 in different embodiments.

In this embodiment, the PE array 650 includes a one-dimensional array of processing elements, each of which includes arithmetic computing circuitry, such as one or more of: a multiplier, an adder, an accumulator, an ALU, a processor or any combinations of the above. In one embodiment, the PE array 650 may be a vector processor that performs vector operations according to vector commands.

Figure 7:
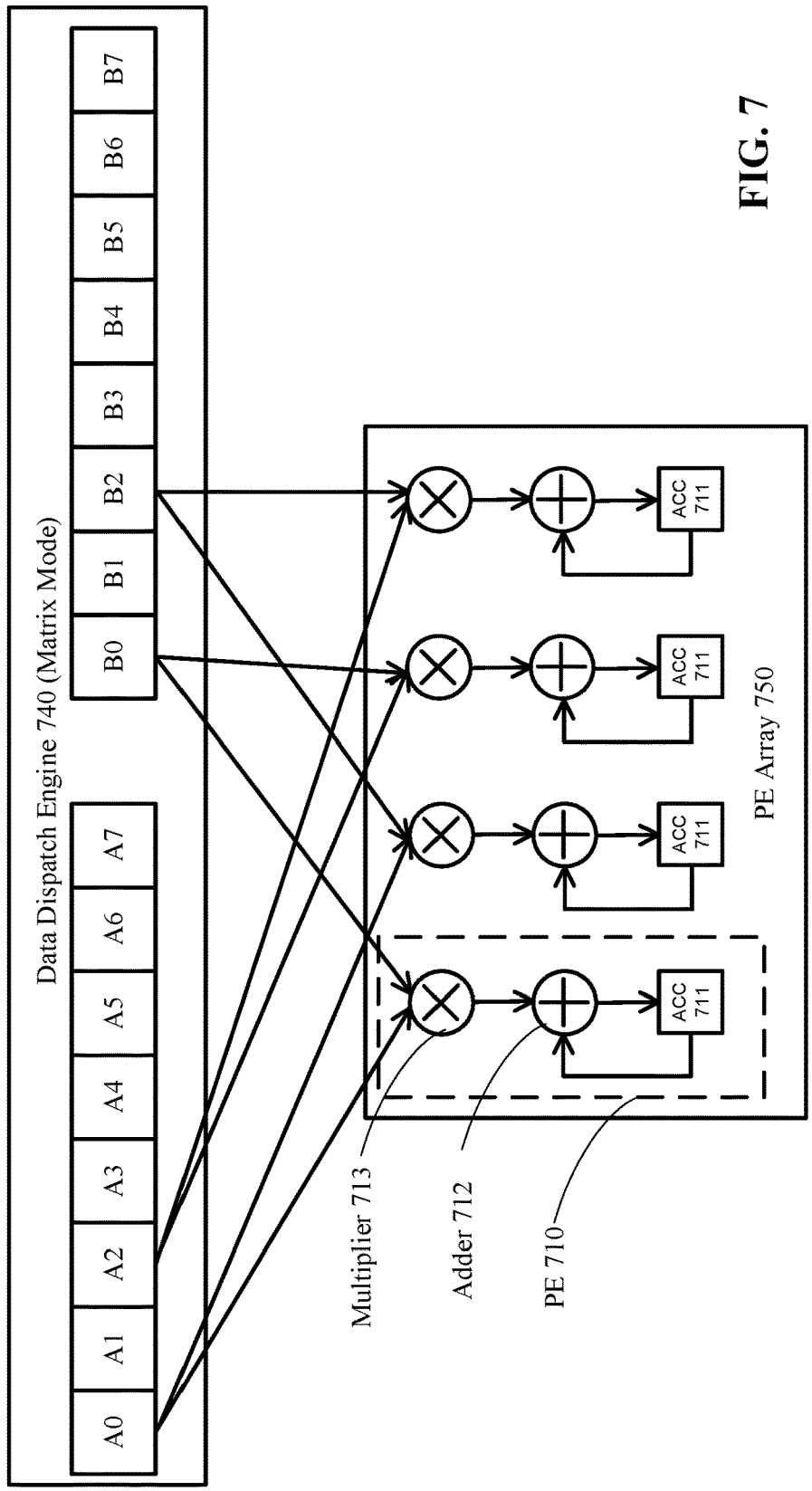
FIG. 7 illustrates a hardware configuration with dispatched data in the matrix mode according to one embodiment.

FIG. 7 illustrates a data dispatch engine 740 in the matrix mode and a PE array 750 according to one embodiment. The data dispatch engine 740 is an example of the data dispatch engine 640, and the PE array 750 is an example of the PE array 650 (FIG. 6). The data dispatch engine 740 dispatches unfolded filter weights (indicated by elements of an array A) and unfolded image data (indicated by elements of an array B) to processing elements 710 in the PE array 750 for matrix multiplications.

In this example, each processing element 710 is shown to include an accumulator 711, an adder 712 and a multiplier 713 for performing multiply-and-add followed by accumulation operations. In an alternative embodiment, each PE 710 may include programmable circuitry that executes instructions or commands to perform multiply-and-add and accumulation operations. It is understood that the hardware components shown in the PE array 750 are illustrative; in alternative embodiments the PE array 750 may include a different number and/or different types of hardware components.

Figure 8:
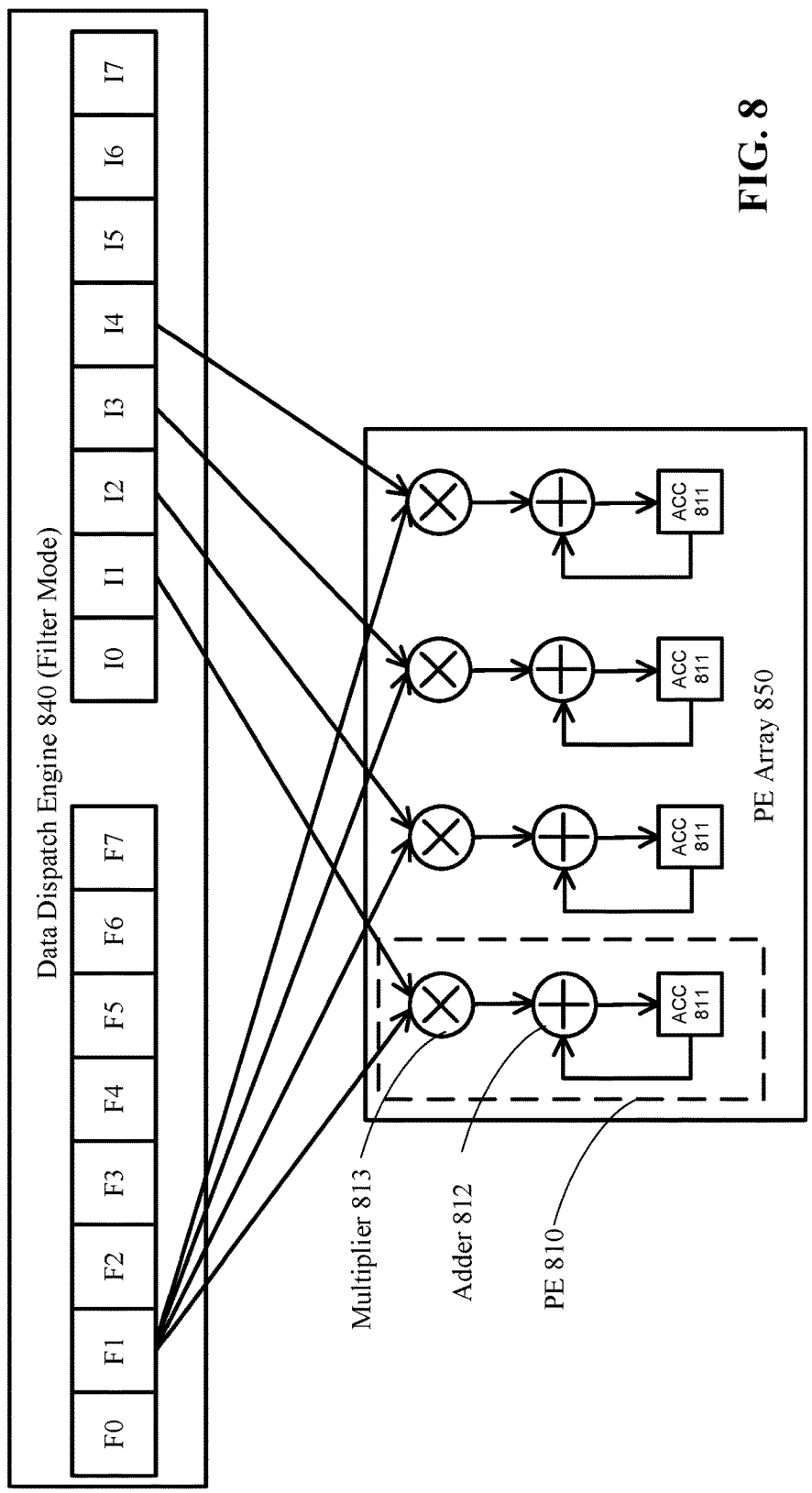
FIG. 8 illustrates a hardware configuration with dispatched data in the filter mode according to one embodiment.

FIG. 8 illustrates a data dispatch engine 840 in the filter mode and a PE array 850 according to one embodiment. The data dispatch engine 840 is an example of the data dispatch engine 640, and the PE array 850 is an example of the PE array 650 (FIG. 6). The data dispatch engine 740 dispatches filter weights (indicated by elements of an array F) and image data (indicated by elements of an array I) to processing elements 810 in the PE array 850 for convolution computations. In the example of FIG. 8 as part of the convolution computations, filter weight F1 is dispatched to all four processing elements 810 for multiplication with four different image data elements.

In this example, each processing element 810 is shown to include an accumulator 811, an adder 812 and a multiplier 813 for performing multiply-and-add followed by accumulation operations. In an alternative embodiment, each processing element 810 may include programmable circuitry that executes instructions or commands to perform multiply-and-add and accumulation operations. It is understood that the hardware components shown in the PE array 850 are illustrative; in alternative embodiments the PE array 850 may include a different number and/or different types of hardware components.

Figure 9:
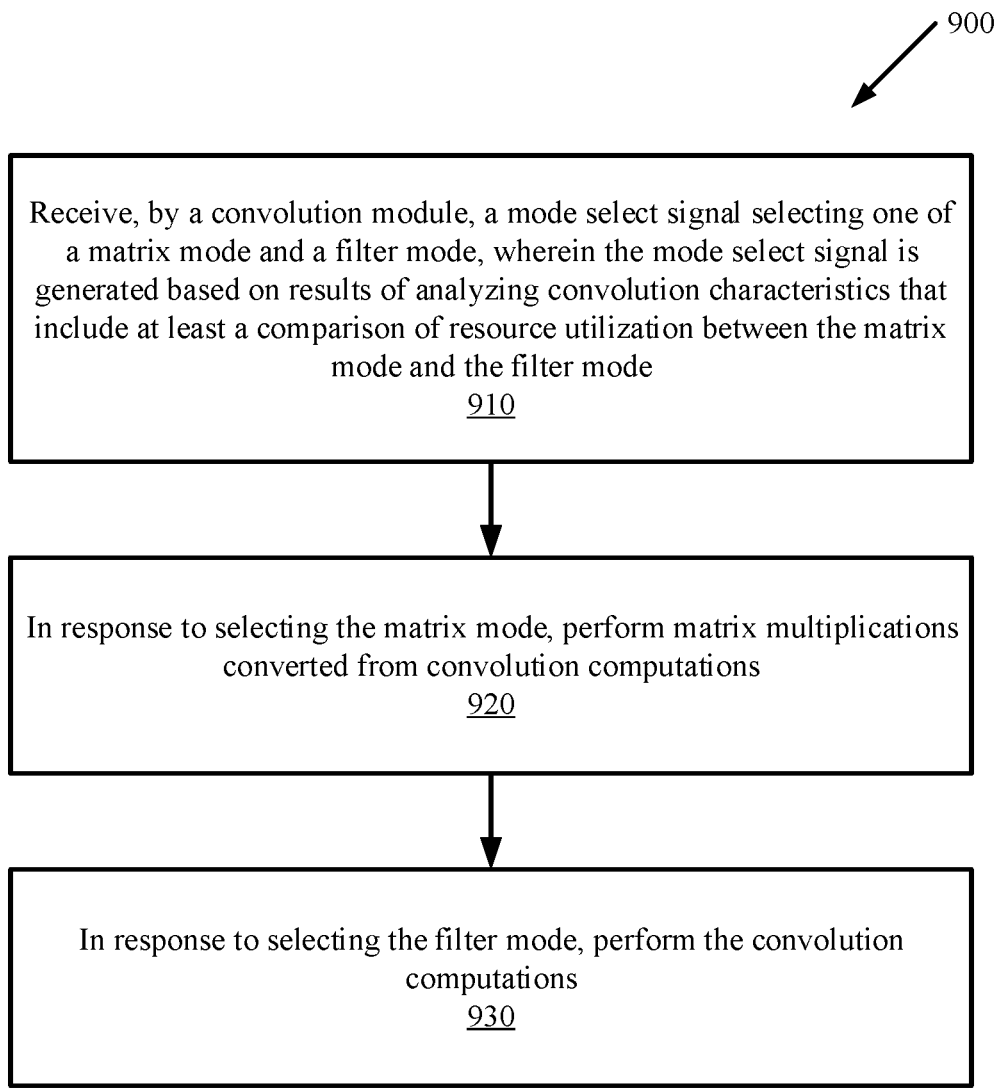
FIG. 9 is a flow diagram illustrating a method for performing convolution computations according to one embodiment.

FIG. 9 is a flow diagram illustrating a method 900 for performing convolution computing according to one embodiment. In one embodiment, the method 900 may be performed by a system (e.g., the system 100 of FIG. 1); more specifically, by a convolution module that includes multiple processing elements, each of which further includes arithmetic computing circuitry. The method 900 begins with a convolution module receiving a mode select signal selecting one of a matrix mode and a filter mode (step 910). The mode select signal is generated based on results of analyzing convolution characteristics that include at least a comparison of resource utilization between the matrix mode and the filter mode. In response to selecting the matrix mode, the convolution module performs matrix multiplications converted from convolution computations (step 920). In response to selecting the filter mode, the convolution module performs the convolution computations (step 930).

In one embodiment, the convolution module may include two PE arrays: one array as a matrix engine which performs matrix multiplications converted from convolution computations, and the other as a filter engine which performs convolution computations. In an alternative embodiment, the convolution module may include one PE array which serves as a hybrid engine which, at runtime according to the mode select signal, performs matrix multiplications in the matrix mode, and convolution computations in the filter mode. The PE array or arrays may be 2D, 1D or other dimensions.

The operations of the flow diagram of FIG. 9 have been described with reference to the exemplary embodiments of FIGS. 1-8. However, it should be understood that the operations of the flow diagram of FIG. 9 can be performed by embodiments of the invention other than the embodiments discussed with reference to FIGS. 1-8, and the embodiments discussed with reference to FIGS. 1-8 can perform operations different than those discussed with reference to the flow diagram. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.). For example, steps 920 and 930 may be performed in any order depending on the mode selected at different times.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system for performing convolution computing, comprising:
an analysis module to generate a mode select signal to select one of a matrix mode and a filter mode based on results of analyzing convolution characteristics, wherein the results include at least a comparison of resource utilization between the matrix mode and the filter mode; and
a convolution module coupled to the analysis module, the convolution module including a plurality of processing elements, each of which includes arithmetic computing circuitry, wherein the convolution module is configured according to the matrix mode for performing matrix multiplications converted from convolution computations, and is configured according to the filter mode for performing the convolution computations.

2. The system of claim 1, wherein the processing elements are configured as two two-dimensional (2D) arrays including a first 2D array for performing the matrix multiplications in the matrix mode and a second 2D array for performing the convolution computations in the filter mode.

3. The system of claim 1, wherein the processing elements are configured as a hybrid 2D array, which, at runtime according to the mode select signal, performs the matrix multiplications in the matrix mode and the convolution computations in the filter mode.

4. The system of claim 1, wherein the processing elements are configured as two one-dimensional (1D) arrays including a first 1D array for performing the matrix multiplications in the matrix mode and a second 1D array for performing the convolution computations in the filter mode.

5. The system of claim 1, wherein the processing elements are configured as a hybrid 1D array, which, at runtime according to the mode select signal, performs the matrix multiplications in the matrix mode and the convolution computations in the filter mode.

6. The system of claim 1, further comprising:
a data dispatch engine to dispatch, according to the mode select signal, input image data and filter weights to corresponding ones of the processing elements.

7. The system of claim 1, wherein the convolution computing includes convolutional neural network (CNN) computing.

8. The system of claim 1, wherein the results include power performance comparison between the matrix mode and the filter mode.

9. The system of claim 1, wherein the convolution characteristics include dimensions of an input image, dimensions of filters used in the convolution computing, and dimensions of the processing elements for performing the convolution computing in parallel.

10. The system of claim 9, wherein the convolution characteristics further includes characteristics including one or more of: input filter count, a stride size of filter weights with respect to pixel values of the input image, input data batch size, color channel arrangements of the filter weights and the pixel values at input to the convolution computing, and color channel arrangements of convolution results at output of the convolution computing.

11. A method for performing convolution computing, comprising:
receiving, by a convolution module, a mode select signal selecting one of a matrix mode and a filter mode, wherein the mode select signal is generated based on results of analyzing convolution characteristics that include at least a comparison of resource utilization between the matrix mode and the filter mode, wherein the convolution module includes a plurality of processing elements, each of which includes arithmetic computing circuitry;
in response to selecting the matrix mode, performing matrix multiplications converted from convolution computations; and
in response to selecting the filter mode, performing the convolution computations.

12. The method of claim 11, further comprising:
performing the matrix multiplications in the matrix mode by a first 2D array of the processing elements; and
performing the convolution computations in the filter mode by a second 2D array of the processing elements, wherein the second 2D array includes different processing elements from the first 2D array.

13. The method of claim 11, further comprising:
performing the matrix multiplications in the matrix mode and the convolution computations in the filter mode by a hybrid 2D array, which includes a same set of the processing elements for the matrix multiplications and the convolution computations.

14. The method of claim 11, further comprising:
performing the matrix multiplications in the matrix mode by a first one-dimensional (1D) array of the processing elements; and
performing the convolution computations in the filter mode by a second 1D array of the processing elements, wherein the second 1D array includes different processing elements from the first 1D array.

15. The method of claim 11, further comprising:
performing the matrix multiplications in the matrix mode and the convolution computations in the filter mode by a hybrid 1D array, which includes a same set of the processing elements for the matrix multiplications and the convolution computations.

16. The method of claim 11, further comprising:
dispatching, according to the mode select signal, input image data and filter weights to corresponding ones of the processing elements.

17. The method of claim 11, wherein the convolution computing includes convolutional neural network (CNN) computing.

18. The method of claim 11, wherein the results include power performance comparison between the matrix mode and the filter mode.

19. The method of claim 11, wherein the convolution characteristics include dimensions of an input image, dimensions of filters used in the convolution computing, and dimensions of the processing elements for performing the convolution computing in parallel.

20. The method of claim 19, wherein the convolution characteristics further includes characteristics including one or more of: input filter count, a stride size of filter weights with respect to pixel values of the input image, input data batch size, color channel arrangements of the filter weights and the pixel values at input to the convolution computing, and color channel arrangements of convolution results at output of the convolution computing.

* * * * *